United States Patent
Kubo et al.

(10) Patent No.: US 8,214,991 B2
(45) Date of Patent: Jul. 10, 2012

(54) METHOD OF REPLACING A SUPPORT BEARING FOR ROLLER BY REMOVING AND REPLACING AN INNER RACEWAY AND MAINTAINING THE REMAINING EXISTING BEARING COMPONENTS

(75) Inventors: Junichi Kubo, Kashiwara (JP); Nobuya Suzuki, Sakurai (JP)

(73) Assignee: JTekt Corporation, Osaka-Shi, Osaka (JP)

( * ) Notice: Subject to any disclaimer, the term of this patent is extended or adjusted under 35 U.S.C. 154(b) by 768 days.

(21) Appl. No.: 12/285,718

(22) Filed: Oct. 14, 2008

(65) Prior Publication Data
US 2009/0094835 A1 Apr. 16, 2009

(30) Foreign Application Priority Data
Oct. 11, 2007 (JP) ................. P2007-265292

(51) Int. Cl.
F16C 35/06 (2006.01)
B23P 6/00 (2006.01)
(52) U.S. Cl. ............... 29/402.08; 29/898.08; 29/898.07; 29/898.01; 29/402.03
(58) Field of Classification Search ............... 29/898.01, 29/898.07, 898.08, 402.03, 402.09, 426.1, 29/898.066, 402.08
See application file for complete search history.

(56) References Cited

U.S. PATENT DOCUMENTS

| | | | | |
|---|---|---|---|---|
| 1,808,469 A | * | 6/1931 | Lothrop | 29/898.08 |
| 1,966,677 A | * | 7/1934 | Naylor | 384/603 |
| 2,001,566 A | * | 5/1935 | Brunner | 384/512 |
| 2,060,446 A | * | 11/1936 | Sanders | 105/221.1 |
| 2,415,324 A | * | 2/1947 | Wilson | 29/898.01 |
| 2,438,214 A | * | 3/1948 | Horger | 384/459 |
| 2,583,261 A | * | 1/1952 | Gerner | 384/559 |
| 2,802,705 A | * | 8/1957 | Halvorsen et al. | 384/459 |
| 3,007,242 A | * | 11/1961 | Hauer et al. | 29/898.01 |
| 3,912,345 A | * | 10/1975 | Overton | 384/584 |
| 4,621,932 A | | 11/1986 | Küfner et al. | |

(Continued)

FOREIGN PATENT DOCUMENTS

JP 2000-61511 2/2000

(Continued)

OTHER PUBLICATIONS

European Search Report dated Dec. 19, 2008.

*Primary Examiner* — David Bryant
*Assistant Examiner* — Jason L Vaughan
(74) *Attorney, Agent, or Firm* — McGinn IP Law Group, PLLC

(57) ABSTRACT

A supporting bearing is replaced with a new supporting bearing by conducting a first step and a second step. In the first step, an old inner ring before replacement is replaced with a new inner ring having an inner ring raceway diameter same as the old inner ring, and an axial length of an inner ring raceway face longer than the old inner ring so that a rolling roll is supported by this new inner ring in combination with an old outer ring and old cylindrical rollers. Thereafter, in the second step, the old cylindrical rollers are replaced with new cylindrical rollers having an axial length longer than the old cylindrical rollers, and simultaneously, the old outer ring is replaced with a new outer ring having an axial length of an outer ring raceway face longer than the old outer ring.

11 Claims, 4 Drawing Sheets

U.S. PATENT DOCUMENTS

| | | | |
|---|---|---|---|
| 5,452,504 A * | 9/1995 | Tatro et al. | 29/597 |
| 5,504,996 A * | 4/1996 | Popovits et al. | 29/898.07 |
| 6,287,100 B1 * | 9/2001 | Achtelik et al. | 418/104 |
| 6,484,403 B1 * | 11/2002 | Macklin et al. | 29/898.01 |
| 6,817,856 B2 * | 11/2004 | Becker et al. | 425/186 |
| 7,065,876 B2 * | 6/2006 | Vimpari | 29/898.02 |
| 7,386,939 B2 * | 6/2008 | Di Giacomo | 29/898.07 |

FOREIGN PATENT DOCUMENTS

| | | |
|---|---|---|
| JP | 2000-61512 | 2/2000 |
| JP | 2005-161407 | 6/2005 |

* cited by examiner

METHOD OF REPLACING A SUPPORT BEARING FOR ROLLER BY REMOVING AND REPLACING AN INNER RACEWAY AND MAINTAINING THE REMAINING EXISTING BEARING COMPONENTS

BACKGROUND OF THE INVENTION

1. Field of the Invention

The present invention relates to a method of replacing a supporting bearing for a rolling roll, and more particularly, to the method of replacing the supporting bearing with a new supporting bearing having an increased rating load.

2. Related Art

In recent years, production facilities, particularly, operation rate of a rolling mill tends to be increased along with expansion of demands for steel products. Because of this increase of the operation rate, it has been conducted to increase rolling load and rolling speed.

However, there occurs a problem that life of a supporting bearing for supporting the rolling roll is decreased due to such increase of the rolling load and the rolling speed. For example, data show that in the supporting bearing for supporting backup rolls in a four step rolling mill, when the rolling load is increased by 10%, the life is decreased by 27%, when the rolling speed is increased by 10%, the life is decreased by 10%, and further, when the production is increased by 10%, the life is decreased by 10%. There are other data that when the rolling load, the rolling speed and the production are respectively increased by 10% at the same time, the life of the supporting bearing is decreased by 40%. In this case, serious influence is given to the rolling operation.

For the purpose of maintaining or prolonging the life of the supporting bearing, it has been considered to replace the supporting bearing which is in use at present for a new supporting bearing having an increased rating load. However, in order to replace the supporting bearings in the entire rolling mill at a time, new supporting bearings corresponding to the number of the rolling rolls must be prepared in advance, which requires an enormous replacing cost at a time. There is another problem that operation of the rolling mill must be stopped for a long time to conduct replacing works. Further, roll chocks and rolling rolls must be modified (worked) along with the replacement of the supporting bearings. In this case, it takes more time to conduct the replacing works, and the operation of the rolling mill must be stopped for a longer time.

There is a conventional art related to a structure for supporting the rolling roll which is disclosed in the following JP-A-2000-61512.

SUMMARY OF THE INVENTION

The invention has been made in view of the above described circumstances, and it is an object of the invention to provide a method of replacing a supporting bearing for a rolling roll in which replacing cost which would be required at a time can be reduced, and a period for stopping operation of a rolling mill can be shortened to the least, by enabling the supporting bearing to be replaced in steps for a new supporting bearing having an increased rating load.

According to the invention, there is provided a method of replacing a supporting bearing for a rolling roll with a new supporting bearing, said supporting bearing including an inner ring engaged with an outer peripheral face of a neck part of the rolling roll, an outer ring disposed outside in a radial direction of said inner ring and having a outer peripheral face thereof supported by a roll chock, and a plurality of cylindrical rollers which are disposed between said inner ring and said outer ring so as to roll, said method comprising steps performed in following order of:

a first step in which an old inner ring before replacement is replaced with a new inner ring having an inner ring raceway diameter same as the old-inner ring, and an axial length of an inner ring raceway face longer than the old inner ring, whereby the rolling roll is supported by the new inner ring in combination with an old outer ring and old cylindrical rollers before replacement, and a second step in which said old cylindrical rollers are replaced with new cylindrical rollers having a larger axial length longer than the old cylindrical rollers, and simultaneously, said old outer ring is replaced with a new outer ring having an axial length of an outer ring raceway face longer than the old outer ring.

According to the invention, when the supporting bearing is replaced, the inner ring is first replaced with a new one, in the first step. On this occasion, the rating load of the supporting bearing can be increased, by increasing the axial length of the inner ring raceway face of the new inner ring. On the other hand, the inner ring raceway diameter of the new inner ring is made equal to that of the old inner ring, and hence, the rolling roll is supported by the supporting bearing having a combination of the new inner ring, the old cylindrical rollers, and the old outer ring.

Then, in the second step, the cylindrical rollers and the outer ring are replaced with new ones. Because the axial lengths of the new cylindrical rollers and the new outer ring are made larger than the old ones, the supporting bearing having the increased rating load can be constructed in combination with the new inner ring which has been already replaced. As the results, it is possible to maintain or prolong the life of the supporting bearing, even though the rolling load and the rolling speed are increased.

As described above, in the method of replacing the supporting bearing according to the invention, the first step for replacing the inner ring and the second step for replacing the cylindrical rollers and the outer ring are conducted separately, and the rolling roll is supported by the supporting bearing at a stage where the first step has been finished. Therefore, the rolling mill can be operated without conducting the second step. In this manner, it is possible to conduct the first step and the second step in separate periods. In this case, in both the first step and the second step, replacing cost which would be required at a time can be reduced, and the period for stopping operation of the rolling mill can be shortened.

Moreover, in case where a roll changing work for replacing a group of the rolling rolls which are used during the rolling operation for another group of the rolling rolls is repeatedly conducted ordinarily, the first step or the second step may be conducted on the rolling roll which is not in use after this roll changing work has been performed, and hence, there is no necessity of substantially stopping the rolling operation.

It would be preferable that an outer ring raceway diameter of the new outer ring is formed larger than an outer ring raceway diameter of the old outer ring, and an outer diameter of the new cylindrical rollers is formed larger than an outer diameter of the old cylindrical rollers. In this manner, it is possible to further increase the rating load of the new supporting bearing.

It would be preferable that work for replacing the old inner ring with the new inner ring is conducted in conformity with the time when the rolling roll is replaced. Generally, a surface of a barrel part of the rolling roll is ground at every determined period, and the rolling roll is replaced in case where an outer diameter of the barrel part is decreased to a certain outer diameter. Therefore, it is possible to smoothly perform transition to the new supporting bearing, by replacing the inner ring in conformity with the time when the rolling roll is replaced, and by constructing the new rolling roll so as to conform with the new inner ring in which the axial length of the inner ring raceway face has been increased.

In case where the old cylindrical rollers are arranged in a plurality of rows in the axial direction, and the new inner ring is composed of a plurality of divided inner rings arranged in the axial direction, it would be preferable that a dividing plane between the divided inner rings is positioned between the rows of the old cylindrical rollers, in the first step. In this manner, the old cylindrical rollers can smoothly roll-on the inner ring raceway face of the new inner ring without covering (without overlapping on) the dividing plane.

According to the invention, it is possible to reduce the replacing cost which would be required at a time, and to shorten the period for stopping operation of the rolling mill to the least, by enabling the supporting bearing to be replaced in steps for the new supporting bearing having an increased rating load.

BRIEF DESCRIPTION OF THE DRAWINGS

FIGS. 2A and 2B are longitudinal sectional views showing an essential part of a rolling roll supporting structure in an embodiment according to the invention, in which FIG. 2A shows a state before the supporting bearing is replaced, and FIG. 2B shows a state where an inner ring of the supporting bearing has been replaced.

FIGS. 3A and 3B are longitudinal sectional views showing the essential part of the rolling roll supporting structure in the embodiment according to the invention, in which FIG. 3A shows the state where the inner ring of the supporting bearing has been replaced, and FIG. 3B shows a state where the cylindrical rollers and an outer ring have been replaced.

DETAILED DESCRIPTION OF THE PREFERRED EMBODIMENTS

Figure 1:
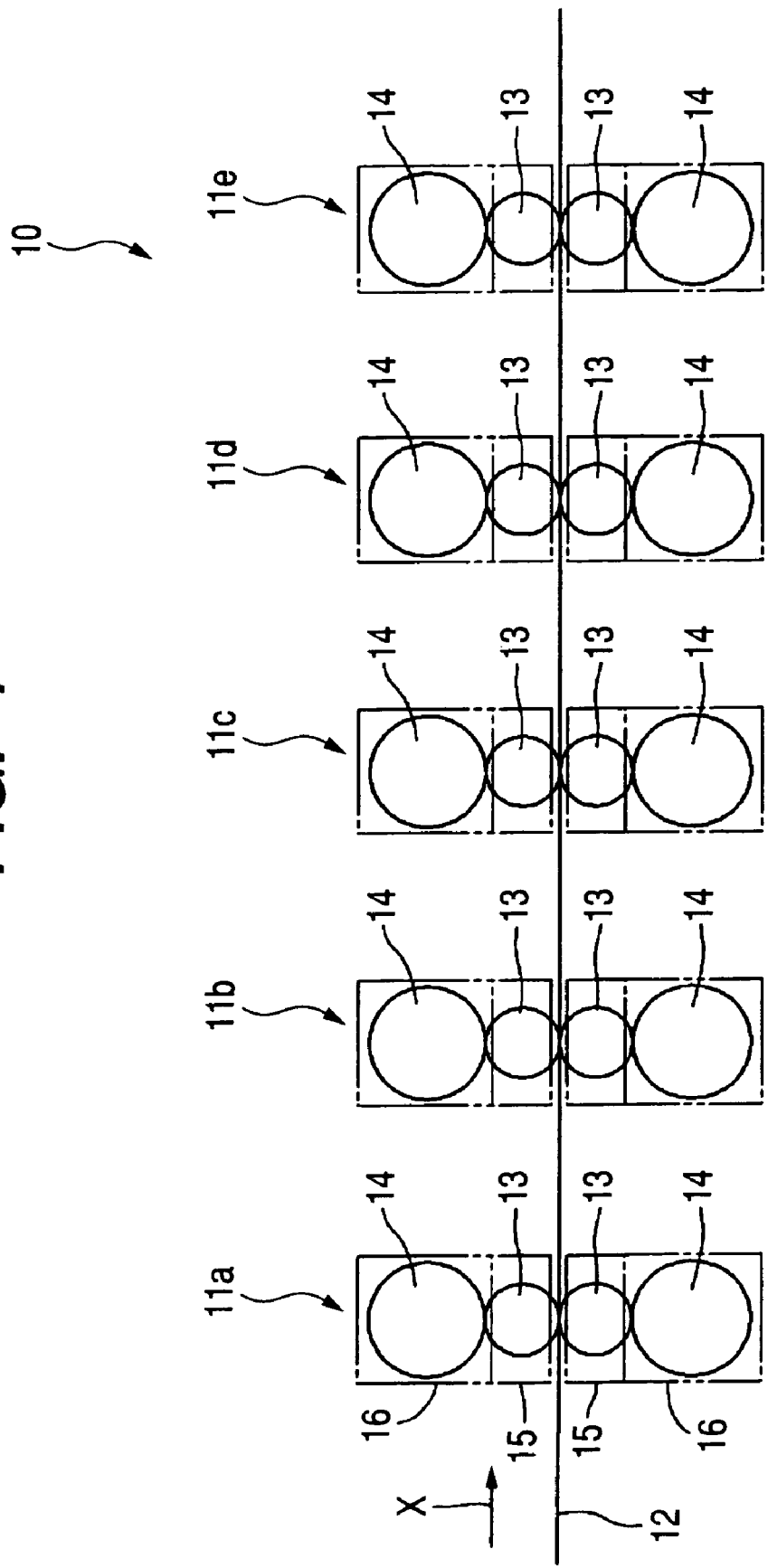
FIG. 1 is a schematic view of a tandem rolling mill to which the invention can be applied.

Now, an embodiment of the invention will be described referring to the drawings.

FIG. 1 is a schematic view of a tandem rolling mill 10 to which the invention can be applied.

This tandem rolling mill 10 includes a plurality of rolling stands (first to fifth stands) 11a to 11e which are provided at intervals in a direction X in which material to be rolled 12 flows. Each of the rolling stands 11a to 11e is, for example, a four step rolling mill, and provided with rolling rolls including a pair of upper and lower work rolls 13 and a pair of upper and lower backup rolls 14. The rolls 13, 14 are respectively supported by roll chocks 15, 16 each having supporting bearings incorporated at both ends thereof in an axial direction.

The method of replacing the supporting bearing according to this invention can be applied to either or both of the work roll 13 and the backup roll 14. However, in the following description, particularly, the case where the invention is applied to the supporting bearing of the backup roll 14 will be described.

Figure 2A:
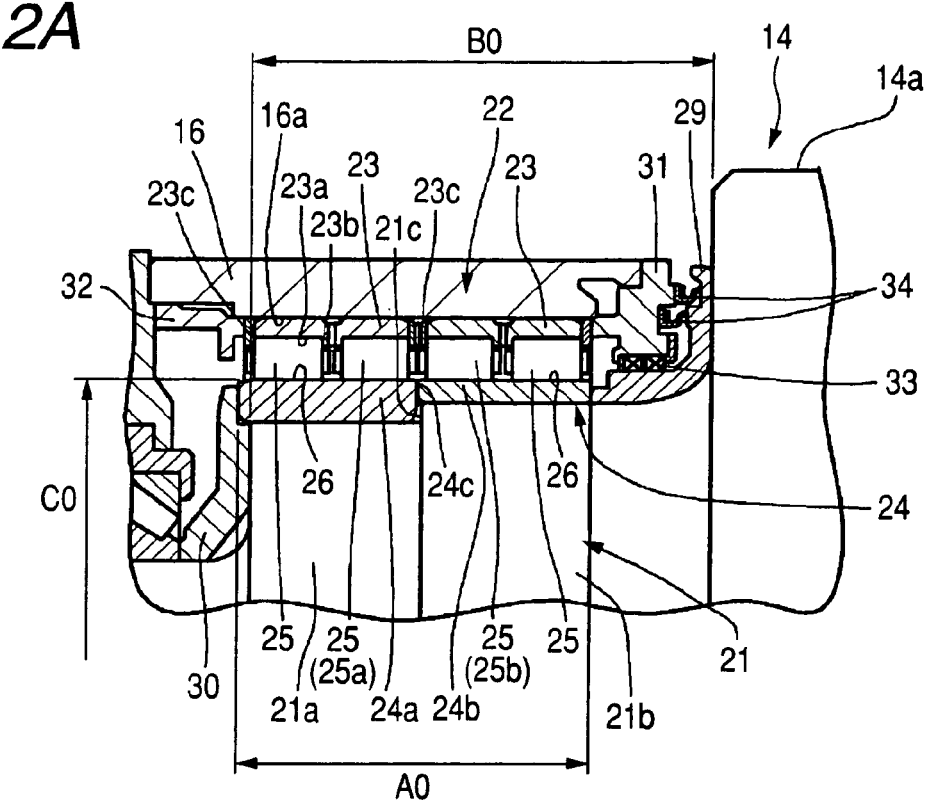
Figure 2B:
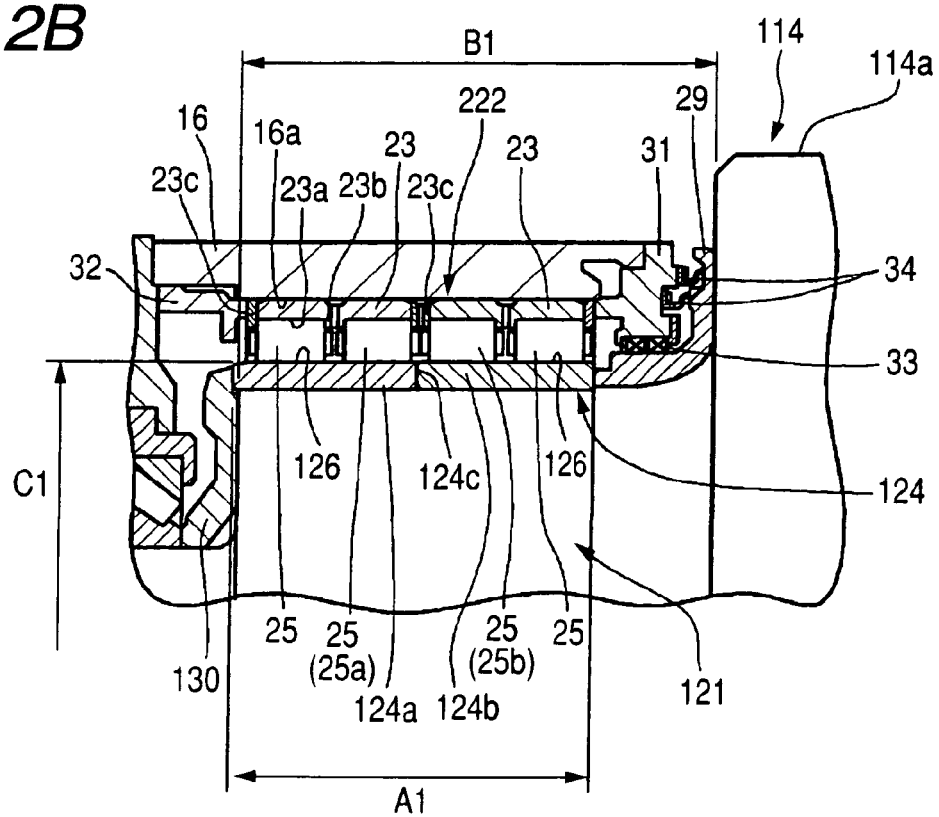
Figure 3A:
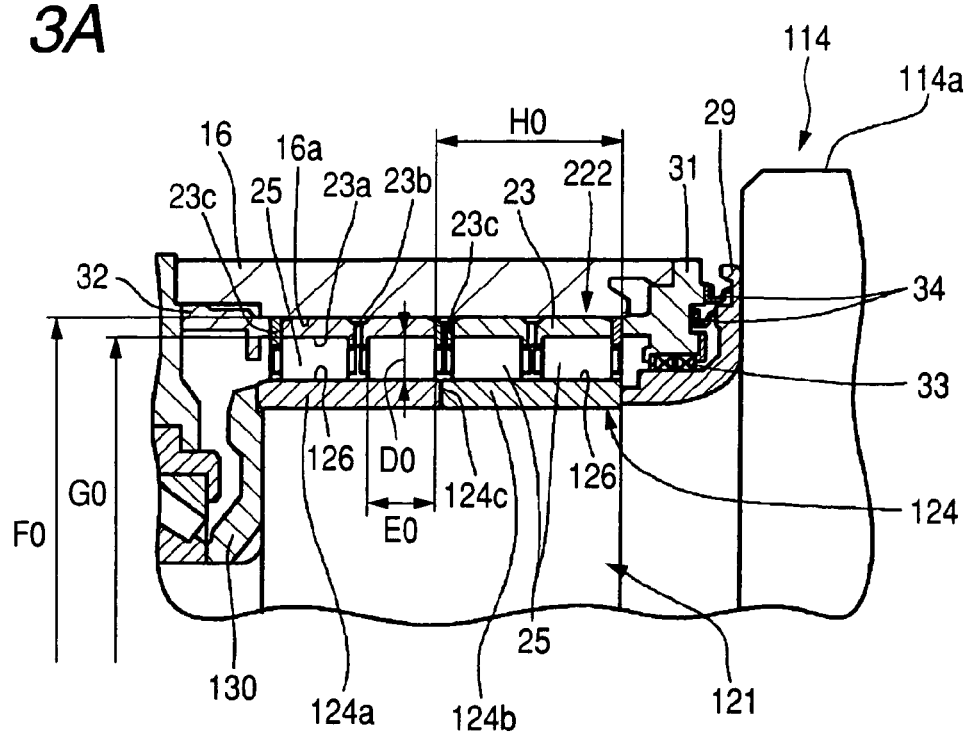
Figure 3B:
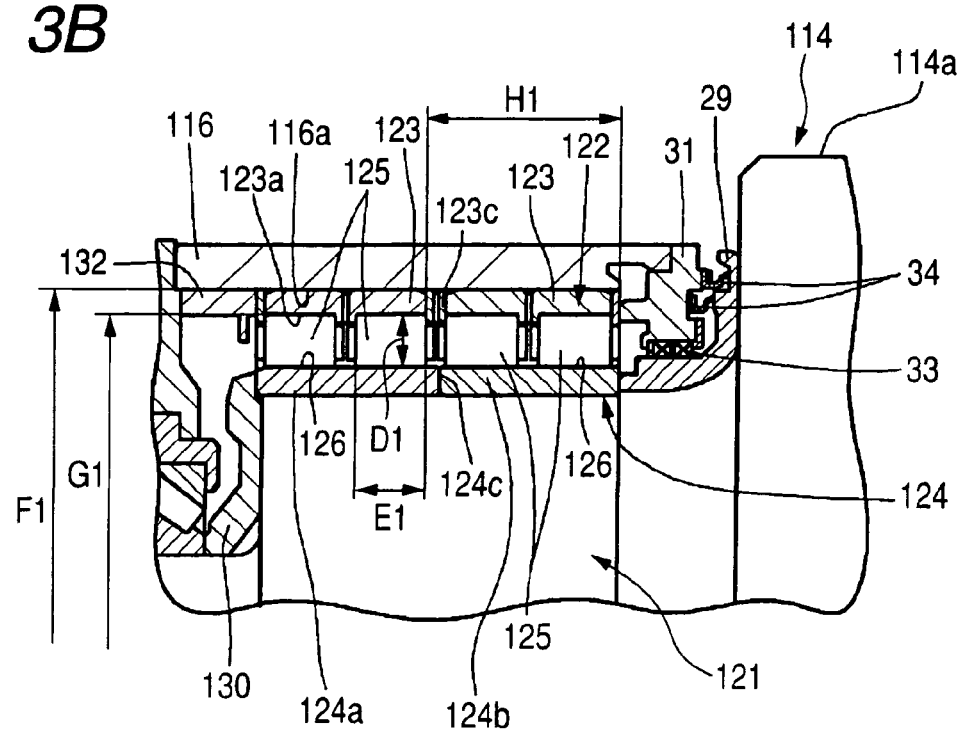

FIGS. 2A to 3B are longitudinal sectional views showing an essential part of the rolling roll supporting structure in the embodiment according to the invention. Particularly, FIG. 2A shows a state before the supporting bearing is replaced. FIG. 2B and FIG. 3A show a state where an inner ring in the supporting bearing has been replaced. FIG. 3B shows a state where cylindrical rollers and an outer ring have been further replaced.

As shown in FIG. 2A, a neck part 21 of the rolling roll (the backup roll) 14 is rotatably supported by the roll chock 16 by means of a supporting bearing 22. The supporting bearing 22 includes an outer ring 23 which is engaged with an outer ring supporting face 16a of the roll chock 16, an inner ring 24 which is arranged inward in the axial direction of this outer ring 23 and engaged with an outer peripheral face of the neck part 21, and a plurality of cylindrical rollers 25 which are disposed between the outer ring 23 and the inner ring 24.

The supporting bearing 22 is a four row cylindrical roller bearing, in which the cylindrical rollers 25 are provided in four rows in the axial direction. The outer rings 23 are provided in two rows in the axial direction, and the respective outer rings 23 have outer ring raceways 23a in two rows in the axial direction on inner peripheral faces thereof. Each of the outer rings 23 is integrally provided with a rib part 23b at a center in the axial direction and a rib ring 23c at both ends in the axial direction. The rib ring 23c provided between the two rows of the outer rings 23 is formed of a spacer. The inner ring 24 includes two divided inner rings 24a, 24b which are arranged in parallel in the axial direction, and butted against each other. The two divided inner rings 24a, 24b have inner ring raceway faces 26 on their outer peripheral faces, on which two of the cylindrical rollers 25 respectively roll. Moreover, the inner ring 24 is not provided with a rib part for restricting axial movements of the cylindrical rollers 25, and the cylindrical rollers 25 are allowed to move in the axial direction on the inner ring raceway faces 26.

The neck part 21 of the rolling roll 14 which is supported by the supporting bearing 22 has a small diameter part 21a at an outer side in the axial direction, and a large diameter part 21b at an inner side in the axial direction, and a stepped part 21c is formed between the small diameter part 21a and the large diameter part 21b. The divided inner ring 24a which is engaged with the small diameter part 21a has a larger wall thickness than the divided inner ring 24b which is engaged with the large diameter part 21b. The inner ring raceway faces 26 of the two divided inner rings 24a, 24b have the same diameter.

The inner ring 24 of the supporting bearing 22 is positioned in the axial direction by means of a fillet ring 29 which can rotate with the rolling roll 14 and an inner ring retaining member including a thrust collar 30, and the outer ring 23 is positioned in the axial direction by means of outer ring retaining members 31, 32 which are fixed to the roll chock 16. Seal members 33 and 34 are provided between the fillet ring 29 and the outer ring retaining member 31.

Then, a method of replacing the supporting bearing 22 will be described in detail.

The method of replacing the supporting bearing 22 in this embodiment includes a first step for replacing the inner ring 24, and a second step for replacing the outer ring 23 and the cylindrical rollers 25. In the following description, the supporting bearing 22, the rolling roll 14, and their constituting members will be represented by affixing "old" or "original" before their names, and the supporting bearing 122, the rolling roll 114, and their constituting members after the replacement will be represented by affixing "new" before their names.

The first step is conducted at the same time when the rolling roll 14 is replaced with a new one. Generally, an outer diameter of the rolling roll 14 becomes gradually small, because the rolling roll 14 is used while a surface of a barrel part 14a is ground at every determined period. When the outer diameter has become smaller than a determined diameter, the old rolling roll 14 is replaced with a new rolling roll 114. In this embodiment, the inner ring 24 is replaced at the time of replacing the old rolling roll 14 with the new rolling roll 114.

After the first step has been conducted, the rolling roll supporting structure is changed from the state as shown in FIG. 2A to the state as shown in FIG. 2B. Specifically, the old inner ring 24 and the old rolling roll 14 as shown in FIG. 2A are replaced with the new inner ring 124 and the new rolling roll 114 as shown in FIG. 2B. An axial length A1 of the new inner ring 124 (an axial length of the inner ring raceway face 126) is larger than an axial length A0 of the old inner ring 24. Moreover, an axial length B1 of a neck part 121 of the new rolling roll 114 is larger than an axial length B0 of the neck part 21 of the old rolling roll 14. The neck part 121 of the new rolling roll 114 is not provided with a stepped part 21c as in the old neck part 21, but its outer peripheral face is uniformly formed.

Further, a diameter C1 of the inner ring raceway of the new inner ring 124 is formed to be equal to a diameter C0 of the inner ring raceway of the old inner ring 24 (C1=C0). Accordingly, the old cylindrical rollers 25 can roll on the inner ring raceway face 126 of the new inner ring 124, and thus, a supporting bearing (hereinafter referred to as "an intermediate supporting bearing") 222 is composed of the new inner ring 124, the old cylindrical rollers 25, and the old outer ring 23.

Because the axial length B1 of the neck part 121 of the new rolling roll 114 is increased and the axial length A1 of the new inner ring 124 is increased, the thrust collar 30 is also replaced with a new thrust collar 130.

Because the intermediate supporting bearing 222 is composed of the new inner ring 124, the old cylindrical rollers 25, and the old outer ring 23, as described above, it is possible to support the new rolling roll 114 so as to roll, by using this intermediate supporting bearing 222. Therefore, it is possible to operate the rolling mill 10, after the first step has been finished.

The new inner ring 124 is divided in two in the axial direction in the same manner as the old inner ring 24. A butting plane (a dividing plane) 124C between the new divided inner rings 124a and 124b is positioned between the old cylindrical rollers 25a and 25b in a center part in the axial direction.

Figure 4A:
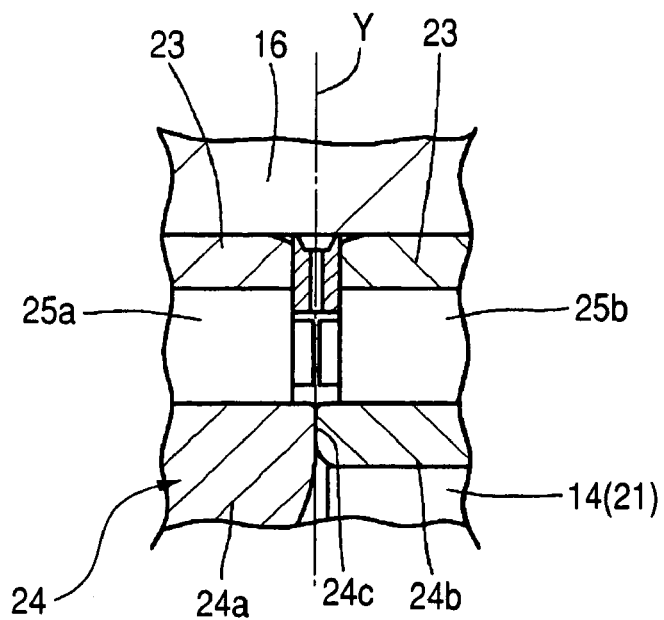
FIG. 4A is an enlarged view of an area around a dividing plane in FIG. 2A.
Figure 4B:
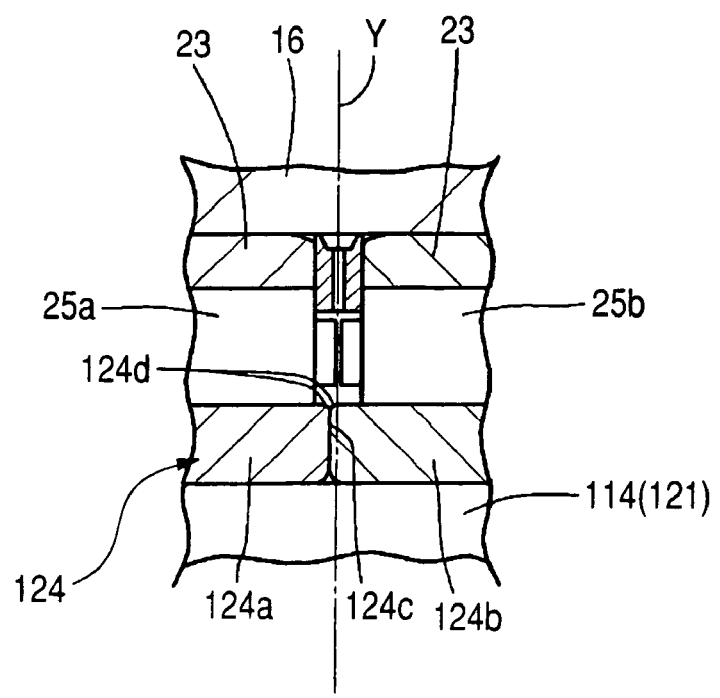
FIG. 4B is an enlarged view of an area around the diving plane in FIG. 2B.

FIG. 4A is an enlarged view showing an area around a dividing plane 24c in FIG. 2A, and FIG. 4B is an enlarged view showing an area around the dividing plane 124c in FIG. 2B. As shown in FIG. 4A, the butting plane 24c between the old divided inner rings 24a, 24b is positioned at a substantially center position Y between the two old cylindrical rollers 25a and 25b (the center position of the supporting structure 22 in the axial direction). By contrast, the butting plane 124c between the new divided inner rings 124a, 124b is positioned between the two old cylindrical rollers 25a and 25b but at a position displaced outward in the axial direction from the center position Y, as shown in FIG. 4B. Further, the new divided inner rings 124a, 124b are arranged in such a manner that outer peripheral chamfered parts 124d at both sides of the butting plane 124c may not cover (may not be overlapped on) the old cylindrical rollers 25a, 25b. In this manner, the old cylindrical rollers 25 can smoothly roll on the inner ring raceway face 126 of the new inner ring 124.

Then, the second step will be described. After the second step has been conducted, the rolling roll supporting structure is changed from the state as shown in FIG. 3A to the state as shown in FIG. 3B. Specifically, the old cylindrical rollers 25 and the old outer ring 23 as shown in FIG. 3A are replaced with new cylindrical rollers 125 and a new outer ring 123 as shown in FIG. 3B. FIG. 3A shows the intermediate supporting bearing 222 at a stage where the first step has been finished, in the same manner as in FIG. 2B.

An outer diameter D1 and an axial length E1 of the new cylindrical roller 125 are respectively larger than an outer diameter D0 and an axial length E0 of the old cylindrical roller 25. Moreover, an outer diameter F1, an outer ring raceway diameter G1, and an axial length H1 of the new outer ring 123 (including a rib ring 123c) are respectively larger than an outer diameter F0, an outer ring raceway diameter G0, and an axial length H1 of the old outer ring 23. Moreover, according to the axial length E1 of the new cylindrical roller 125, the axial length of the outer ring raceway face 123a of the new outer ring 123 is larger than the axial length of the outer ring raceway face 23a of the old outer ring 23. As the results, the new supporting bearing 122 which is composed of the new inner ring 124, the new cylindrical rollers 125, and the new outer ring 123 is increased in rating load as compared with the old supporting bearing 22 (See FIG. 2A). Because the rating load of the supporting bearing 122 is increased in this manner, it is possible to maintain or prolong the life of the supporting bearing 122, even though the rolling load and the rolling speed of the rolling mill 10 are increased.

As the outer diameter F1 of the new outer ring 123 is increased, a diameter (an inner diameter) of an outer ring supporting face 116a of the new roll chock 116 is also made larger. In order to increase the diameter of the outer ring supporting face 116a, it is possible to enlarge the diameter by scraping off the old outer ring supporting face 16a through mechanical work or by replacing the roll chock 16 itself with a new one.

Moreover, according to the increase of the axial length H1 and the outer diameter F1 of the new outer ring 123, the outer ring retaining member 32 is also replaced with the new outer ring retaining member 132.

Such replacement from the old supporting bearing 22 with the new supporting bearing 122 can be conducted, for example, in the rolling roll in which rolling operation is stopped, or which is not in use after the roll changing work, as shown in FIG. 1. Firstly, only the first step is conducted on either or all of a plurality of the rolling stands 11a to 11e, and thereafter, the rolling operation is restarted in this state where the first step has been finished. Then, the second step can be conducted, after an appropriate period has passed, (for example, at a stage where the new outer ring 123 and the new cylindrical rollers 125 to be replaced have been prepared). Therefore, there is no necessity of conducting all the steps (the first step and the second step) at a time, but the first step and the second step can be conducted separately after a period. In this manner, it is possible to reduce the replacing cost which would be required at a time, and it is possible to restart the rolling operation in a shorter period, or to continue the rolling operation substantially without stopping the operation.

Moreover, mechanical work or replacement of the roll chock 16 in the second step can be also performed in the following manner.

As a first step, for one of the rolling stands (the first stand 11a for example; See FIG. 1), the new roll chock 116 according to the outer diameter F1 of the new outer ring 123 is produced in advance. Then, the old roll chock 16 is replaced with the new roll chock 116 at a stage where the second step is conducted on the first stand 11a. On this occasion, the mechanical work is not conducted on the old roll chock 16 during the second step, and therefore, it is possible to finish the second step in a short time, and to shorten the period for stopping the operation.

Then, the old roll chock 16 which has been detached from the first stand 11a is subjected to the mechanical work for increasing the diameter of the outer ring supporting face 16a as described above, for the purpose of using the old roll chock 16 as the new roll chock 116 for the other stand (for example, the second stand 11b). This mechanical work is performed, while the operation is restarted after the second step has been conducted on the first stand 11a.

When the second step is conducted on the second stand 11b, the old roll chock 16 of this second stand is replaced with the new roll chock 116 which has been detached from the first stand 11a and has been mechanically worked. On this occasion too, it is possible to finish the second step in a short time, and to shorten the period for stopping the operation, because the mechanical work is not conducted on the old roll chock 16 during the second step.

Thereafter, in the same manner, the old chocks 16 are used in rotation, in such a manner that the old roll chock 16 which has been detached from the second stand 11b and mechanically worked is used as the new roll chock 116 for the third stand 11c, the old roll chock 16 which has been detached from the third stand 11c and mechanically worked is used as the new roll chock 116 for the fourth stand 11d, and so on. In this manner, the new roll chock 116 to be newly produced is only the one for the first stand 11a, and the replacing cost can be reduced. Then, the old roll chock 16 which has been detached from the final fifth stand 11e can be kept in reserve as the new roll chock 116, after the determined mechanical work has been performed.

The invention is not limited to the above described embodiment, but can be adequately modified. For example, the first step is not necessarily conducted at the time of when the rolling roll is replaced. Moreover, in the new supporting bearing, the inner ring raceway diameter of the new inner ring, the outer diameter of the new cylindrical rollers, the outer ring raceway diameter of the new outer ring may be equal to those in the old supporting bearing, and only the axial lengths of the inner ring raceway face of the new inner ring, the new cylindrical rollers, and the outer ring raceway face of the new outer ring may be increased thereby to increase the rating load.

What is claimed is:

1. A method of replacing a supporting bearing for a rolling roll with a new supporting bearing, said supporting bearing including an old inner ring disposed on an outer peripheral face of a neck portion of the rolling roll, wherein an old outer ring is disposed outside, in a radial direction, of said old inner ring, the old outer ring having an outer peripheral face thereof supported by a roll chock, and a plurality of old cylindrical rollers, the cylindrical rollers being disposed between said inner ring and said outer ring so as to roll, said method of replacing the supporting bearing comprising:

replacing the old inner ring with a new inner ring, the new inner ring comprising an inner ring raceway diameter equal to an inner ring raceway diameter of the old inner ring, and an axial length of an inner ring raceway face of the new inner ring which is longer than an axial length of an inner ring raceway face of the old inner ring;

after the replacing of the old inner ring with the new inner ring, operating the rolling roll and the supporting bearing prior to replacing the old outer ring or the old cylindrical rollers; and replacing said old cylindrical rollers with new cylindrical rollers having an axial length longer than an axial length of the old cylindrical rollers, and replacing said old outer ring with a new outer ring, the new outer ring comprising an axial length of an outer ring raceway face longer than an axial length of an outer ring raceway face of the old outer ring.

2. A method of replacing a supporting bearing for a rolling roll as claimed in claim 1, wherein an outer ring raceway diameter of said new outer ring is formed larger than an outer ring raceway diameter of said old outer ring, and an outer diameter of said new cylindrical rollers is formed larger than an outer diameter of said old cylindrical rollers.

3. A method of replacing a supporting bearing for a rolling roll as claimed in claim 1,
 wherein the replacing said old inner ring with said new inner ring is conducted at a time when said rolling roll is replaced.

4. A method of replacing a supporting bearing for a rolling roll as claimed in claim 3, wherein the neck portion includes a stepped portion on which the old inner ring is disposed and the new rolling roll comprises a new neck portion, the new neck portion having a continuous diameter.

5. A method of replacing a supporting bearing for a rolling roll as claimed in claim 1, wherein said old cylindrical rollers are arranged in a plurality of rows in an axial direction, and said new inner ring is composed of a plurality of divided inner rings arranged in the axial direction the divided inner rings being positioned such that a dividing plan; extending in a radial direction, between said divided inner rings is positioned axially between the rows of said old cylindrical rollers.

6. A method of replacing a supporting bearing for a rolling roll as claimed in claim 1, wherein the replacing of the old cylindrical rollers is performed after the replacing of the old inner ring.

7. A method of replacing a supporting bearing for a rolling roll as claimed in claim 1, wherein the replacing of the old cylindrical rollers is performed after the replacing of the old inner ring and the replacing of the old outer ring.

8. A method of replacing a supporting bearing for a rolling roll as claimed in claim 1, wherein the old outer ring and old cylindrical rollers are assembled with the new inner ring prior to replacing the old cylindrical rollers and replacing the old outer ring.

9. A method of replacing a supporting bearing for a rolling roll as claimed in claim 1, wherein the old inner ring comprises at least two divided old inner rings having an abutting plane where the at least two divided old inner rings abut, and the new inner ring comprises at least two divided new inner rings having an other abutting plane where the at least two divided new inner rings abut, and
 wherein the at least two divided new inner rings are configured such that the abutting plane is shifted axially along the neck portion with respect to the other abutting plane.

10. A method of replacing a supporting bearing for a rolling roll as claimed in claim 1, wherein the replacing of the old outer ring further comprises replacing the roll chock with a new roll chock.

11. A method of replacing a supporting bearing for a rolling roll as claimed in claim 10, further comprising:
 machining the roll chock; and
 using the machined roll chock to replace an other roll chock of an other supporting bearing.

* * * * *